E. L. PHIPPS.
HARVESTER REELS.
No. 189,257.    Patented April 3, 1877.
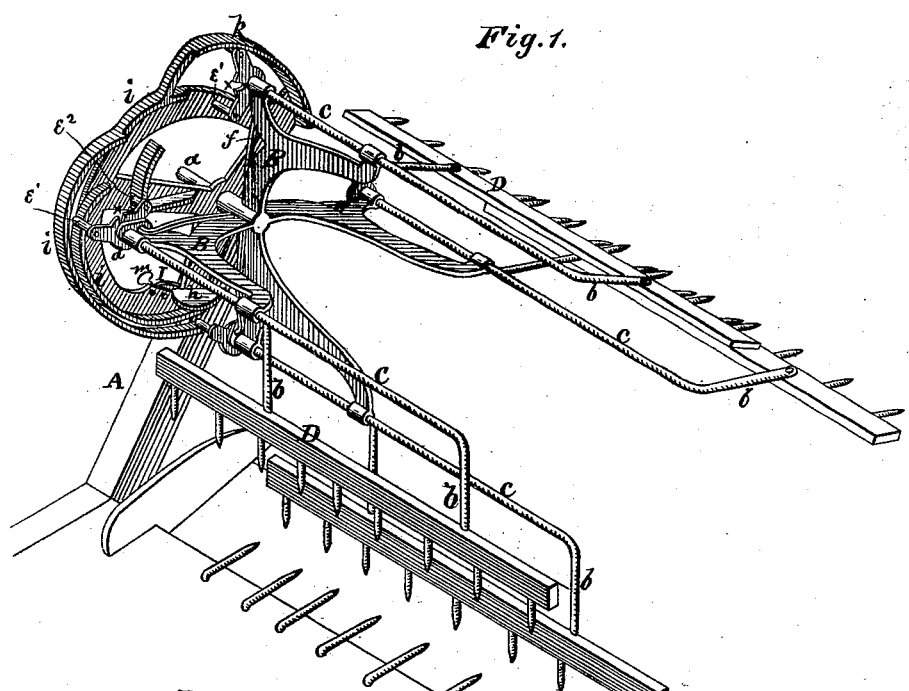
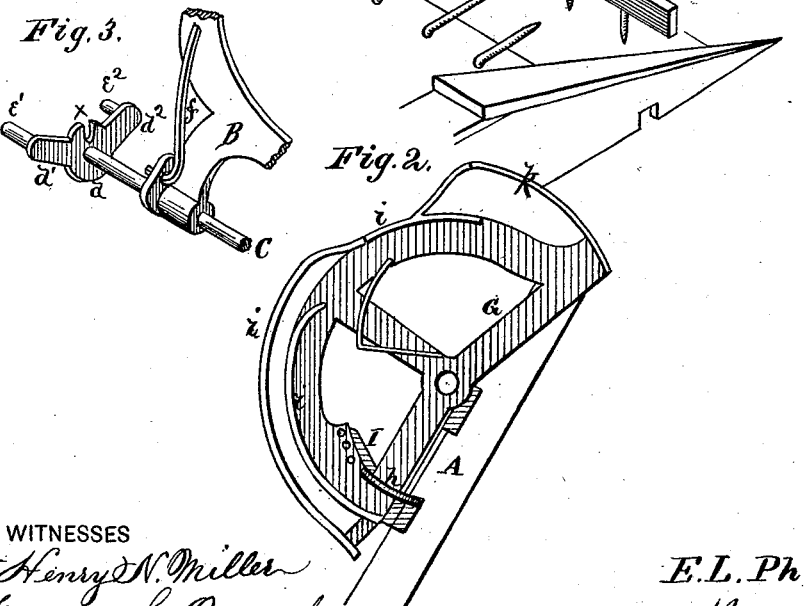
WITNESSES
Henry N. Miller
Franck L. Durand
INVENTOR
E. L. Phipps.
Alexander & Mason
ATTORNEYS.

UNITED STATES PATENT OFFICE.

EDWARD L. PHIPPS, OF MILFORD, MICHIGAN.

IMPROVEMENT IN HARVESTER-REELS.

Specification forming part of Letters Patent No. 189,257, dated April 3, 1877; application filed February 1, 1877.

*To all whom it may concern:*

Be it known that I, EDWARD L. PHIPPS, of Milford, in the county of Oakland, and in the State of Michigan, have invented certain new and useful Improvements in Harvester-Reel; and do hereby declare that the following is a full, clear, and exact description thereof, reference being had to the accompanying drawings, and to the letters of reference marked thereon, making a part of this specification.

The nature of my invention consists in the construction and arrangement of a harvester-reel, as will be hereinafter more fully set forth.

In order to enable others skilled in the art to which my invention appertains to make and use the same, I will now proceed to describe its construction and operation, referring to the annexed drawing, in which—

Figure 1 is a perspective view of my improved harvester-reel. Figs. 2 and 3 are detached views of parts thereof.

A represents the usual reel-post, upon which is a suitable box to receive the reel-shaft $a$, said shaft receiving its rotary motion, by any suitable means, from the harvester. On the inner end of the shaft $a$ is secured a four-armed spider, B, each arm of which is provided with suitable bearings to receive a shaft, C, having a rake, D, connected to it by arms $b\ b$, as shown.

On the end of each shaft C, nearest to the reel-post, is fastened a disk, $d$, having two arms, $d^1\ d^2$, extending nearly in opposite directions; and from the outer ends of said arms project pins or studs $e^1\ e^2$, respectively, which studs, in a full-sized machine, will be provided with friction-rollers. In the disk $d$ is a slot or perforation, $x$, into which a spring-catch, $f$, is to take, said catch being fastened to the spider B.

On the inner side of the post A is fastened a plate or frame, G, provided with suitable tracks for the operation of the reel-rakes, as will be hereinafter described.

Each rake D, in its turn, operates on and throws the grain backward on the harvester-platform. During this part of its revolution the rake-shaft C is held rigid by the spring-catch $f$, lying in the slot $x$ on the disk $d$.

As the rake passes out of the grain the spring-catch $f$ is forced back by means of a cam, $h$, projecting from the plate G, and at the same time the stud $e^1$ passes between two flanges, $i\ i$, and guides the rake in a perpendicular position until the stud $e^2$ strikes and passes under a flange, $k$, which causes the shaft C to turn in its bearings sufficiently, so that when the stud $e^2$ emerges from under said flange $k$ the spring-catch $f$ shall have entered the slot $x$ on the disk $d$, and thus hold the shaft and rake rigid again, and in proper position to enter and act upon the grain.

The reel rakes or arms D are thus raised straight up from the cutters, so as to be out of the way of the rake operating on the harvester-platform.

The track, composed of the flanges $i\ k$, carries the reel-arms straight up from the point where the catch is thrown out, and folds them under, and carries them then out in position to enter the grain, and they are held rigid by a catch until they are unlocked by the cam on the track-plate.

The track-plate G is centered on the shaft $a$, and adjustably fastened to the reel-post A by means of a perforated bracket, I, secured to the post, and to which the track-plate is held by a pin, $m$. By this means the track-plate can be adjusted on or around its center, so as to make the reel-arms operate in a proper manner.

Having thus fully described my invention, what I claim as new, and desire to secure by Letters Patent, is—

1. In a harvester-reel, the combination of the shafts C, having the rakes or arms D rigidly connected thereto, and mounted in the rotating spider B, the disks $d$, having slots $x$ and arms $d^1\ d^2$, with projecting studs $e^1\ e^2$, and the spring-catches $f$, substantially as and for the purposes herein set forth.

2. The adjustable track-plate G, having cam $h$ and flanges $i\ k$, in combination with the reel, having independently-operating shafts C, with arms or blades D, spider B, and disks with arms, slots, and projecting studs, and a spring, all substantially as and for the purposes herein set forth.

In testimony that I claim the foregoing I have hereunto set my hand this 12th day of January, 1877.

EDWARD L. PHIPPS.

Witnesses:
WILLIAM A. ARMS,
JOHN E. CRAWFORD.